United States Patent [19]

Hong

[11] Patent Number: 5,501,917
[45] Date of Patent: Mar. 26, 1996

[54] HYDROGEN STORAGE MATERIAL AND NICKEL HYDRIDE BATTERIES USING SAME

[76] Inventor: Kuochih Hong, 1790 Rolling Woods, Troy, Mich. 48098

[21] Appl. No.: 189,080

[22] Filed: Jan. 28, 1994

[51] Int. Cl.⁶ ........................................ H01M 4/02
[52] U.S. Cl. ............................ 429/101; 429/59; 429/97; 429/209; 420/417; 420/443; 420/455; 420/580; 420/900
[58] Field of Search ........................ 429/59, 97, 101, 429/209; 420/900, 417, 443, 455, 580

[56] References Cited

U.S. PATENT DOCUMENTS

| | | |
|---|---|---|
| 3,660,082 | 5/1972 | Negishi et al. . |
| 4,160,014 | 7/1979 | Gamo et al. . |
| 4,195,989 | 4/1980 | Gamo et al. . |
| 4,370,163 | 1/1983 | Moriwaki et al. . |
| 4,431,561 | 2/1984 | Oushinsky . |
| 4,440,736 | 4/1984 | Macland et al. . |
| 4,457,891 | 7/1984 | Bernauer et al. . |
| 4,551,400 | 11/1985 | Sapru et al. . |
| 4,623,597 | 11/1986 | Sapru et al. . |
| 4,716,088 | 12/1987 | Reichman et al. . |
| 4,728,586 | 3/1988 | Uenkatesan . |
| 4,849,205 | 7/1989 | Hong . |
| 4,946,646 | 8/1990 | Gamo et al. . |
| 5,006,328 | 4/1991 | Hong . |
| 5,096,667 | 3/1992 | Fetcenko . |
| 5,104,617 | 4/1992 | Fetcenko et al. . |
| 5,242,656 | 9/1993 | Zhang et al. . |
| 5,242,656 | 9/1993 | Zhaup et al. ...................... 420/417 |

FOREIGN PATENT DOCUMENTS

| | | |
|---|---|---|
| 55-91950 | 7/1980 | Japan . |
| 60-241652 | 11/1985 | Japan . |

*Primary Examiner*—Prince Willis, Jr.
*Assistant Examiner*—M. Nyzzolillo

[57] ABSTRACT

Improved multicomponent alloys for hydrogen storage and rechargeable hydride electrode applications, and in particular for rechargeable hydride battery applications, according to the formula: $A_aB_bNi_cD_yM_xR_z$, and the hydride thereof, where A is at least one element selected from the group consisting of Ti, Zr, Hf, Y, V, Nb, Pd, Mg, Be, and Ca; B is at least one element selected from the group consisting of Mg, Al, V, Wb, Ta, Cr, Mn, Si, C, B, and Mo; D is at least one element selected from the group consisting of W, Fe, Co, Cu, Zn, Ag, Sb and Sn; M is at least one element selected from the group consisting of Li, Na, K, Rb, Cs, P, S, Sr, and Ba; R is at least one element selected from the group consisting of Sc, Y, La, Ce, Pr, and Yb; and where a, b, c, x, y and z are defined by: $0.10 \leq a \leq 0.85$, $0.02 \leq b \leq 0.85$, $0.02 \leq c \leq 0.85$, $0.01 \leq x \leq 0.30$, $0 \leq y \leq 0.25$, $0 \leq z \leq 0.12$ and $a+b+c+x+y=1.00$. In another aspect, this invention is directed to provide a rechargeable electrochemical cell (battery) using the improved hydrogen storage alloy given in the present invention.

22 Claims, 1 Drawing Sheet

HYDROGEN STORAGE MATERIAL AND NICKEL HYDRIDE BATTERIES USING SAME

BACKGROUND OF THE INVENTION

1. Field of the Invention

This invention relates to multicomponent alloys for use in hydrogen storage, hydride heat pump and rechargeable hydrogen storage electrode applications. More particularly, the invention relates to rechargeable batteries comprising a nickel-hydride, or silver-hydride couple in which the negative electrode is the hydride/hydrogen storage electrode.

2. Description of the Related Art

The present invention is an improved hydrogen storage and/or hydride electrode alloy derived from the materials described in U.S. Pat. Nos.: 4,370,163; 4,551,400; 4,716,088; 4,728,586; 4,946,646; 4,849,205; 5,006,328; 5,096,667; and 5,104,617. These patents reported multicomponent alloys containing oxygen sensitive metals such as titanium, vanadium and zirconium. These metals are very active and always form oxide layers on their surface. During the alloy preparation at high temperature, they are particularly sensitive to oxygen in the melting chamber and oxidize with the other substances in the melting furnace. As a result, the quality of the alloys obtained are somewhat not as good as expected. Furthermore, the alloy powder and the electrode made therefrom are sensitive to the oxygen in the environment at every process stage such as sintering, pasting and charging/discharging in alkaline solution. Moreover, some alloys might have high capacity, but they are not easy to activate and/or maintain operational life. Consequently, the electrochemical properties such as rate capability, charging efficiency and cycle life will suffer badly. And, for gas hydrogen storage or purification applications, they are more easily poisoned by impurity gases. Thus, capacity and life drop. For hydride heat pump applications, oxide formation will increase the hysteresis leading to difficulty for the hydride pair to match and the efficiency reduces substantially.

Very recently, U.S. Pat. No. 5,242,656 on Sep. 7, 1993 was issued to Zhang et al. Zhang disclosed two group of hydride electrode materials: 1) a $CaNi_5$-type alloy, $M_mNi_{5-x-y-z-u}A_xB_yC_zD_u$, where $M_m$ is mischmetal, A equals Mn, Sn, or V; B equals Cr, Co, Ti, Zr, or Si; C equals Al, Mg, or Ca; D equals Li, Na, or K; and $0 \leq x \leq 0.95$, $0 \leq y \leq 1$, $0 \leq z 0.7$, $0.1 \leq u \leq 0.9$; and 2) a ternary alloy, $Ti_2NiD_u$, where D equals Li, Na, or K; and $0.04 \leq u \leq 0.9$. Zhang described their materials as having a better result because of the inclusion of Li, Na or K. However, while these two groups are different from the multicomponent alloy systems mentioned above, they do not solve the aforementioned problems.

To solve these problems, the present invention provides new alloys for hydrogen storage and in particular for rechargeable hydride electrodes for battery applications.

SUMMARY OF THE INVENTION

The present invention discloses the following improved multicomponent alloys for hydrogen storage and rechargeable hydride electrode applications, and in particular for rechargeable hydride battery applications, according to the formula: $A_aB_bNi_cD_yM_xR_z$, and the hydride thereof, where A is at least one element selected from the group consisting of Ti, Zr, Hf, Y, V, Nb, Pd, Mg, Be, and Ca; B is at least one element selected from the group consisting of Mg, Al, V, Nb, Ta, Cr, Mn, Si, C, B, and Mo; D is at least one element selected from the group consisting of W, Fe, Co, Cu, Zn, Ag, Sb and Sn; M is at least one element selected from the group consisting of Li, Na, K, Rb, Cs, P, S, Sr, and Ba; R is at least one element selected from the group consisting of Sc, Y, La, Ce, Pr, Yb; and where a, b, c, x and y are defined by: $0.10 \leq a \leq 0.85$, $0.02 \leq b \leq 0.85$, $0.02 \leq c \leq 0.85$, $0.01 \leq x \leq 0.30$, $0 \leq y \leq 0.25$, $0 \leq z \leq 0.12$, and $a+b+c+x+y+z=1.00$.

In another aspect, this invention is directed to provide a rechargeable electrochemical cell (battery) using the improved hydrogen storage alloy given in the present invention.

The advantages, feature and other objects of the present invention will become obvious from the following detailed description.

DETAILED DESCRIPTION OF THE PREFERRED EMBODIMENTS

Figure 1:
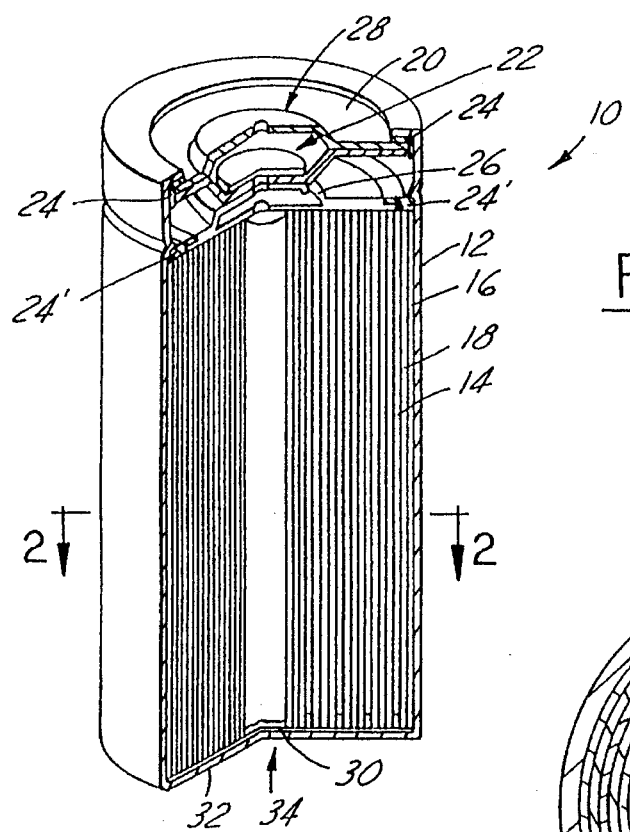
FIG. 1 is a partly sectional view of a battery according to the present invention.

The present invention discloses improved multicomponent alloys which can serve as a hydride for reversible hydrogen storage and as a negative electrode active material for electrochemical applications, and more particularly, can be used in a rechargeable battery having a nickel-hydride or silver-hydride couple.

The improved multicomponent alloys in the present invention are represented by the following formula: $A_aB_bNi_cD_yM_xR_z$, and its hydride, where A is at least one element selected from the group consisting of Ti, Zr, Hf, Y, V, Nb, Pd, Mg, Be and Ca; B is at least one element selected from the group consisting of Mg, Al, V, Nb, Ta, Cr, Mn, Si, C, B, and Mo; D is at least one element selected from the group consisting of W, Fe, Co, Cu, Zn, Ag, Sb and Sn; M is at least one element selected from the group consisting of Li, Na, K, Rb, Cs, P, S, Sr and Ba; R is at least one element selected from the group consisting of Sc, Y, La, Ce, Pr, and Yb; and where the atomic mole ratios, a, b, c, x, y and z are defined by: $0.10 \leq a \leq 0.85$, $0.02 \leq b \leq 0.85$, $0.02 \leq c \leq 0.85$, $0.01 \leq x \leq 0.30$, $0 \leq y \leq 0.30$, $0 \leq z \leq 0.12$, and $a+b+c+x+y+z=1.00$. Preferably, $0.25 \leq a \leq 0.63$, $0.10 \leq b \leq 0.55$, $0.15 \leq c \leq 0.60$, $0.03 \leq x \leq 0.15$, $0 \leq y \leq 0.15$, and $0 \leq z \leq 0.05$.

There are several additional factors to consider regarding the selection of elements for inclusion in the multicomponent alloy according to the present invention. The inclusion of 1 to 30 mole percent of Li, Na, K, Rb, Cs, Sr, Ba, P or S can serve as a strong oxygen getter, thus the alloy obtained is more clean and easy to activate. More importantly, they can play a role as hydride former, thus increasing the hydrogen storage capacity and/or lower the hydrogen equilibrium pressure. For electrochemical applications, Li, Na, K, Rb, Cs, Ba, and Sr are particularly useful. They are incorporated in some phases in the alloy. These phases will be oxided in alkaline electrolyte and dissolve as soluble hydroxide such as LiOH and $Ba(OH)_2$. Thus, the performance of the cell will be improved, especially the cycle life will be much longer.

Alloys having compositions according to the present invention can be prepared by mixing proper amounts of the elements first and then melting them in a crucible (graphite, alumina, zirconia, or water-cooled copper) in an induction or arc furnace under a protective atmosphere such as argon.

To store gaseous phase hydrogen, the active materials of the invention can be charged at 2 to 50 atmospheres of pressure of pure hydrogen after evacuating the whole system at ambient temperature. A moderate temperature of between 100 to 300 degrees Centigrade will accelerate the hydriding/dehydriding processes.

For the electrochemical application, an electrode containing the active material of the present invention is first prepared by sintering or by a pasted method with a suitable binder such as nickel, copper, aluminum or organic binders such as PTFE, CMC, PVA (polyvinyl alcohol). The current collector can be nickel or nickel-plated steel mesh, sponge, or perforated or expanded foil. A suitable size of the negative electrode active material is cut, and a similar size of the positive electrode material is cut. The positive electrode material is a metal oxide, preferably a nickel oxide. A separator is cut of a similar size and is placed between the negative and positive electrodes to electrically separate them. Preferably, the separator is nonwoven nylon. Finally, an electrolyte is added to complete an electrochemical cell (battery).

Figure 2:
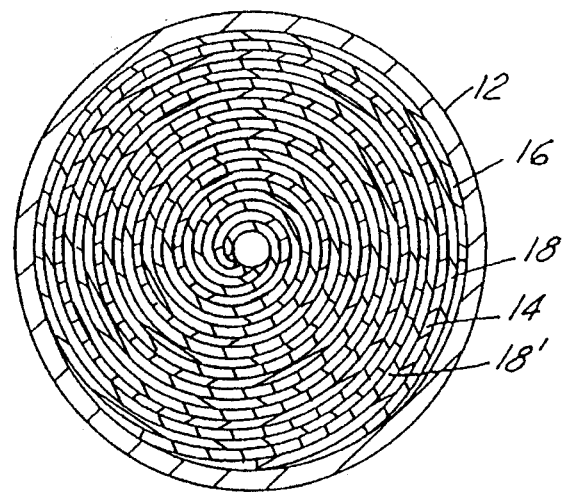
FIG. 2 is a sectional plan view of the battery according to the present invention, seen along line 2—2 in FIG. 1.

An exemplification of a hydride battery according to the present invention is depicted in FIGS. 1 and 2. In this regard, a sealed metal oxide-hydride battery 10 is composed of an exterior casing 12, a positive electrode 14, a negative (hydride) electrode 16 and a separator 18 disposed between the positive and negative electrodes. In this regard, the negative electrode 16, positive electrode 14 and the separator 18 are mutually spirally wound, as shown in FIG. 2. A cover 20 is sealably connected with the casing 12, and is provided with a resealable safety vent 22. An electrically insulating member 24 separates the cover 20 from the casing 12. A first tab 26 is connected with the positive electrode 14. The first tab 26 is mounted to the casing 12 by an electrically insulating member 24' and is also connected with the cover 20, resulting in the cover being the positive terminal 28 of the battery 10. A second tab 30 is connected with the negative electrode 16. The second tab 30 is also connected with the bottom 32 of the casing, making the bottom the negative terminal 34 of the battery 10. Before the cover 20 is sealed with respect to the casing 12, a suitable amount of electrolyte is placed within the casing. For example, the casing 12 and cover 20 is a suitable conductive metal, the positive electrode 14 is sheet nickel hydroxide, the negative electrode 16 is a sheet of $A_aB_bNi_cD_yM_xR_z$ hydride material according to the present invention, the separator 18 is sheet nylon, and the electrolyte is a KOH solution.

In operation, during charging hydroxide ions pass through the separator, via the electrolyte from the negative to the positive electrodes and water molecules pass through the separator, via electrolyte, from the positive to the negative electrode. During discharge, wherein a load is placed across the positive and negative terminals, water molecules pass through the separator, via the electrolyte, from the negative to the positive electrode and hydroxide molecules pass through the separator, via the electrolyte, from the positive electrode to the negative electrode.

EXAMPLE 1

Alloys having compositions in the present invention are given in Table 1. These alloys were prepared in an arc or induction furnace under an argon atmosphere. The hydrogen storage capacity of these alloys was tested in a Sievert's type apparatus. These alloys were very easily activated. After evacuation, these alloys, in the form of pulverized powder, readily absorbed hydrogen at ambient temperature. These alloys can store hydrogen up to 3.5 percent of their own weight (H/M wt. %). These alloys have long hydrogen absorption/desorption cycle life. No significant degradation was observed after 300 cycles.

TABLE 1

| No. | Alloy Composition | Hydrogen Storage Capacity (H/M wt. %) |
|---|---|---|
| 1 | $Ti_{0.35}V_{0.35}Ni_{0.25}Li_{0.05}$ | 3.34 |
| 2 | $Ti_{0.30}Zr_{0.05}V_{0.30}Ni_{0.30}Li_{0.05}$ | 3.50 |
| 3 | $Ti_{0.30}Nb_{0.35}Mn_{0.20}Ni_{0.05}Al_{0.05}Na_{0.05}$ | 2.85 |
| 4 | $Ti_{0.30}Nb_{0.40}Mn_{0.15}Ni_{0.10}S_{0.05}$ | 2.78 |
| 5 | $Ti_{0.25}V_{0.35}Mn_{0.15}Ni_{0.10}Fe_{0.10}Ba_{0.05}$ | 2.52 |
| 6 | $Ti_{0.30}V_{0.30}Mn_{0.15}Ni_{0.10}Co_{0.05}Li_{0.10}$ | 2.94 |
| 7 | $Ti_{0.30}Zr_{0.05}V_{0.15}Mn_{0.45}Ni_{0.03}Na_{0.02}$ | 2.40 |
| 8 | $Ti_{0.25}Ca_{0.15}V_{0.20}W_{0.10}Fe_{0.20}Ni_{0.05}S_{0.05}$ | 2.37 |
| 9 | $Ti_{0.30}V_{0.45}Mn_{0.12}Fe_{0.05}Ni_{0.03}Li_{0.05}$ | 2.93 |

EXAMPLE 2

Alloys having compositions according to the present invention are also given in Table 2. The hydrogen storage electrodes were prepared by sintering or by a pasted method using a nickel-plated mesh as the collector. The electrodes containing about 1 to 3 grams active material were tested electrochemically in a 30 wt. % KOH solution with a nickel positive electrode as the counter electrode. The electrochemical capacity was measured at various rates to −0.75 V versus a Hg/HgO reference electrode. As shown in Table 2, materials made according to the present invention have high capacity. They also have a long cycle life, good rate capability and are very easy to activate.

TABLE 2

| No. | Alloy Composition | Electrochemical Capacity (mAH/g) |
|---|---|---|
| 10 | $Ti_{0.10}Zr_{0.15}Cr_{0.10}V_{0.30}Ni_{0.30}Li_{0.05}$ | 332 |
| 11 | $Ti_{0.26}Zr_{0.15}Cr_{0.06}V_{0.10}Ni_{0.36}Al_{0.03}Li_{0.04}$ | 340 |
| 12 | $Ti_{0.26}Zr_{0.17}Cr_{0.05}V_{0.10}Ni_{0.38}Na_{0.04}$ | 362 |
| 13 | $Ti_{0.10}Zr_{0.15}Mn_{0.07}V_{0.35}Ni_{0.28}Li_{0.05}$ | 342 |
| 14 | $Ti_{0.23}Zr_{0.10}Hf_{0.02}V_{0.20}Ni_{0.43}Ba_{0.02}$ | 310 |
| 15 | $Ti_{0.20}Zr_{0.20}Cr_{0.08}Mn_{0.10}V_{0.08}Ni_{0.30}Li_{0.04}$ | 358 |
| 16 | $Ti_{0.25}Zr_{0.05}Mg_{0.05}V_{0.20}Ni_{0.35}Li_{0.10}$ | 330 |
| 17 | $Zr_{0.35}V_{0.10}Ni_{0.45}Cu_{0.05}Na_{0.05}$ | 290 |
| 18 | $Ti_{0.10}Zr_{0.20}Mo_{0.10}Ni_{0.50}Li_{0.05}Ba_{0.05}$ | 365 |
| 19 | $Ti_{0.50}Zr_{0.05}Si_{0.05}Ni_{0.35}K_{0.05}$ | 332 |
| 20 | $Ti_{0.50}Zr_{0.05}B_{0.05}Ni_{0.35}Li_{0.05}$ | 305 |
| 21 | $Ti_{0.45}Ca_{0.05}Zr_{0.05}Ni_{0.35}Li_{0.03}Ba_{0.02}$ | 290 |
| 22 | $Ti_{0.22}Zr_{0.20}Cr_{0.05}V_{0.18}Ni_{0.31}Li_{0.04}$ | 355 |
| 23 | $Ti_{0.24}Zr_{0.17}Hf_{0.02}V_{0.18}Ni_{0.35}Li_{0.04}$ | 365 |
| 24 | $Ti_{0.25}Zr_{0.16}Cr_{0.06}V_{0.15}Nb_{0.05}Ni_{0.30}Na_{0.03}$ | 348 |
| 25 | $Ti_{0.10}Zr_{0.15}Mn_{0.08}V_{0.20}Ni_{0.35}Co_{0.05}Li_{0.07}$ | 305 |

EXAMPLE 3

Alloys made according to the present invention were used as the active materials of negative electrode of rechargeable sealed nickel-hydride cells of "AA" size, hereafter referred to as Cell A. The negative (hydride) electrode of Cell A was a sintered type and was made of a $Ti_{0.23}Cr_{0.03}V_{0.43}Ni_{0.28}Li_{0.03}$ active material according to the present invention. It was packed with a pasted nickel positive electrode and separated therefrom by a nonwoven nylon separator. The electrolyte was 30 wt. % KOH+5% LiOH solution. The capacity and its cycle life were thereupon tested. As shown in Table 3, below, after 350 cycles, less than 12% capacity drop was observed.

For comparison, a similar size "AA" cell, hereafter referred to as Cell B, having a negative (hydride) electrode made of a $Ti_{0.22}Cr_{0.11}V_{0.43}Ni_{0.24}$ material known in the prior art, was tested. The result is shown in Table 3. As Table 3 makes clear, Cell A made with a material according to the present invention had a much better performance than Cell B made with a material known in the prior art.

EXAMPLE 4

Alloys made according to the present invention were used as active materials of the negative electrode of rechargeable sealed nickel-hydride cells of "C" size, hereafter referred to as Cell C. The negative (hydride) electrode of Cell C was made of an $Ti_{0.26}Zr_{0.15}Cr_{0.06}V_{0.10}Ni_{0.38}Li_{0.04}$ active material according to the present invention. The Cell C was prepared and tested similar to the method given in Example 3 for Cell A, except the negative (hydride) electrode was made by a pasted method using methylcellulose as the binder.

For comparison, a similar size "C" cell, hereafter referred to as Cell D, having a negative (hydride) electrode made of a $Ti_{16}Zr_{16}Cr_7V_{22}Ni_{39}$ material known in the prior art was tested. The result is shown in Table 3. As Table 3 makes clear, Cell C made with a material according to the present invention had much better performance than Cell D made with a material known in the prior art.

TABLE 3

Electrochemical Data of Sealed Nickel-Hydride Cells.
Cells A and C are made with active materials according to the invention; Cells B and D are made with active materials known in the prior art.

| Cycle No. | Capacity mAH ("AA" size) | | Capacity mAH ("C" size) | |
|---|---|---|---|---|
| | Cell A | Cell B | Cell C | Cell D |
| 1 | 1050 | 620 | 3058 | 2130 |
| 2 | 1120 | 780 | 3280 | 2305 |
| 3 | 1180 | 810 | 3495 | 2530 |
| 4 | 1220 | 840 | 3580 | 2705 |
| 5 | 1225 | 863 | 3640 | 2748 |
| 6 | 1238 | 874 | 3777 | 2803 |
| 7 | 1242 | 880 | 3856 | 2855 |
| 8 | 1243 | 900 | 3880 | 2920 |
| 9 | 1243 | 908 | 3885 | 2930 |
| 10 | 1242 | 902 | 3884 | 2917 |
| 11 | 1246 | 903 | 3887 | 2924 |

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A material for forming a hydride, for hydrogen storage and for forming a hydride electrode, said material comprising:

a material selected from the group having composition formula $A_aB_bNi_cD_yM_xR_z$, wherein A is at least one element selected from the group consisting of Ti, Zr, Hf, Y, V, Nb, Pd, Mg, Be and Ca; B is at least one element selected from the group consisting of Mg, Al, V, Nb, Ta, Cr, Mn, Si, C, B, and Mo; D is at least one element selected from the group consisting of W, Fe, Co, Cu, Zn, Ag, Sb and Sn; M is at least one element selected from the group consisting of Li, Na, K, Rb, Cs, P, S, Sr and Ba; R is at least one element selected from the group consisting of Sc, Y, La, Ce, Pr and Yb; and where the atomic mole ratios a, b, c, x, y and z are defined by: $0.10 \leq a \leq 0.85$, $0.02 \leq b \leq 0.85$, $0.02 \leq c \leq 0.85$, $0.01 \leq x \leq 0.30$, $0 \leq y \leq 0.30$, $0 \leq z \leq 0.12$, and a+b+c+x+y+z=1.00.

2. The material of claim 1, further comprising a hydride thereof.

3. The material of claim 2, wherein said material comprises a hydride electrode of an electrochemical cell.

4. The material of claim 2, wherein said material comprises an active material in a hydrogen storage apparatus.

5. The material of claim 1, wherein $0.25 \leq a \leq 0.63$, $0.10 \leq b \leq 0.55$, $0.15 \leq c \leq 0.60$, $0.03 \leq x \leq 0.15$, $0 \leq y \leq 0.15$, and $0 \leq z \leq 0.05$.

6. The material of claim 5, further comprising a hydride thereof.

7. An electrochemical cell, comprising:

a casing;

a negative electrode;

a positive electrode;

a separator positioned between said negative and positive electrodes, said separator and said positive and negative electrodes being located in said casing; and an electrolyte located in the said casing and in contact with said negative and positive electrodes and with said separator;

wherein said negative electrode comprises:

a material selected from the group having composition formula $A_aB_bNi_cD_yM_xR_z$, wherein A is at least one element selected from the group consisting of TI, Zr, Hf, Y, V, Nb, Pd, Mg, Be and Ca; B is at least one element selected from the group consisting of Mg, Al, V, Nb, Ta, Cr, Mn, Si, C, B, and Mo; D is at least one element selected from the group consisting of W, Fe, Co, Cu, Zn, Ag, Sb and Sn; M is at least one element selected from the group consisting of Li, Na, K, Rb, Cs, P, S, Sr and Ba; R is at least one element selected from the group consisting of Sc, Y, La, Ce, Pr and Yb; and where the atomic mole ratios, a, b, c, x, y and z are defined by: $0.10 \leq a \leq 0.85$, $0.02 \leq b \leq 0.85$, $0.02 \leq c \leq 0.85$, $0.01 \leq x \leq 0.30$, $0 \leq y \leq 0.30$, $0 \leq z \leq 0.12$, and a+b+c+x+y+z=1.00.

8. The electrochemical cell of claim 7, wherein $0.25 \leq a \leq 0.63$, $0.10 \leq b \leq 0.55$, $0.15 \leq c \leq 0.60$, $0.03 \leq x \leq 0.15$, $0 \leq y \leq 0.15$ and $0 \leq z \leq 0.05$.

9. The electrochemical cell of claim 8, wherein said positive electrode comprises a metal oxide.

10. The electrochemical cell of claim 9, wherein said electrolyte comprises an alkaline solution.

11. The electrochemical cell of claim 10, wherein said separator comprises non-woven nylon.

12. A material for forming a hydride, for hydrogen storage and for forming a hydride electrode, said material comprising:

a material selected from the group having composition formula $A_aB_bNi_cD_yM_xR_z$, wherein A is at least one element selected from the group consisting of Ti, Zr, Hf, Ca and Mg; B is at least one element selected from the group consisting of Al, V, Nb, Ta, Mn, Cr; D is one or more element selected from the group consisting of Co, Fe and Cu; M is at least one element selected from the group consisting of Li, Na, K, and Ba; R is at least one element selected from the group consisting of Sc, Y, La, Ce, Pr and Yb; and where the atomic mole ratios, a, b, c, x, y and z are defined by: $0.10 \leq a \leq 0.85$, $0.02 \leq b \leq 0.85$, $0.02 \leq c \leq 0.85$, $0.01 \leq x \leq 0.30$, $0 \leq y \leq 0.30$, $0 \leq z \leq 0.12$, and $a+b+c+x+y+z=1.00$.

13. The material of claim 12, further comprising a hydride thereof.

14. The material of claim 13, wherein said material comprises a hydride electrode of an electrochemical cell.

15. The material of claim 13, wherein said material comprises an active material in a hydrogen storage apparatus.

16. The material of claim 12, wherein $0.25 \leq a \leq 0.63$, $0.10 \leq b \leq 0.55$, $0.15 \leq c \leq 0.60$, $0.035 \leq x \leq 0.15$, $0 \leq y \leq 0.15$, $0 \leq z \leq 0.05$, and $a+b+c+x+y+z=1.00$.

17. The material of claim 16, further comprising a hydride thereof.

18. An electrochemical cell, comprising:

a casing;

a negative electrode;

a positive electrode;

a separator positioned between said negative and positive electrodes, said separator and said positive and negative electrodes being located in said casing; and an electrolyte located in the said casing and in contact with said negative and positive electrodes and with said separator;

wherein said negative electrode comprises:

a material selected from the group having composition formula $A_a B_b Ni_c D_y M_x R_z$, where A is at least one element selected from the group consisting of Ti, Zr, Hf, Ca and Mg; B is at least one element selected from the group consisting of Al, V, Nb, Ta, Mn, Cr; D is at least one element selected from the group consisting of Co, Fe and Cu; M is at least one element selected from the group consisting of Li, Na, K and Ba; R is at least one element selected from the group consisting of Sc, Y, La, Ce, Pr and Yb; and where the atomic mole ratios, a, b, c, x, y and z are defined by: $0.10 \leq a \leq 0.85$, $0.02 \leq b \leq 0.85$, $0.02 \leq c \leq 0.85$, $0.01 \leq x \leq 0.30$, $0 \leq y \leq 0.30$, $0 \leq z \leq 0.12$, and $a+b+c+x+y+z=1.00$.

19. The electrochemical cell of claim 18, wherein $0.25 \leq a \leq 0.63$, $0.10 \leq b \leq 0.55$, $0.15 \leq c \leq 0.60$, $0.03 \leq x \leq 0.15$, $0 \leq y \leq 0.15$, $0 \leq z \leq 0.05$, and $a+b+c+x+y+z=1.00$.

20. The electrochemical cell of claim 19, wherein said positive electrode comprises a metal oxide.

21. The electrochemical cell of claim 20, wherein said electrolyte comprises an alkaline solution.

22. The electrochemical cell of claim 21, wherein said separator comprises non-woven nylon.

* * * * *